United States Patent
Bergmann et al.

(10) Patent No.: US 8,721,828 B2
(45) Date of Patent: May 13, 2014

(54) METHOD FOR THE PRODUCTION OF HOLLOW BODIES FROM THERMOPLASTIC AND APPARATUS FOR CARRYING OUT THE METHOD

(75) Inventors: Guido Bergmann, St. Augustin (DE); Carsten Elsasser, Pulheim (DE); Marcus Schmitz, Siegburg (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 13/809,243

(22) PCT Filed: Mar. 30, 2011

(86) PCT No.: PCT/EP2011/001590
§ 371 (c)(1),
(2), (4) Date: Jan. 9, 2013

(87) PCT Pub. No.: WO2012/003896
PCT Pub. Date: Jan. 12, 2012

(65) Prior Publication Data
US 2013/0112345 A1 May 9, 2013

(30) Foreign Application Priority Data
Jul. 9, 2010 (DE) .......................... 10 2010 026 717

(51) Int. Cl.
*B29C 65/18* (2006.01)
(52) U.S. Cl.
USPC ...................... 156/244.11; 156/500; 156/228
(58) Field of Classification Search
USPC ..................................................... 156/244.11
See application file for complete search history.

(56) References Cited

U.S. PATENT DOCUMENTS

| 5,103,865 | A | 4/1992 | Hyde |
| 6,153,143 | A | 11/2000 | Condon |
| 6,187,252 | B1 | 2/2001 | Rhoades et al. |
| 8,003,041 | B2 | 8/2011 | Borchert et al. |
| 2003/0044553 | A1* | 3/2003 | Ramanathan et al. ....... 428/35.8 |
| 2009/0014422 | A1* | 1/2009 | Miklos et al. ................... 219/75 |
| 2009/0309270 | A1* | 12/2009 | Buchholz et al. ............. 264/544 |

FOREIGN PATENT DOCUMENTS

DE  10010900 A1 * 9/2001

OTHER PUBLICATIONS

Canadian Office Action dated Jun. 13, 2013, received in corresponding Canadian Patent Application No. 2,798,655, 3 pgs.

* cited by examiner

*Primary Examiner* — Philip Tucker
*Assistant Examiner* — Vicki Wu
(74) *Attorney, Agent, or Firm* — Grossman Tucker Perreault & Pfleger, PLLC

(57) ABSTRACT

The invention refers to a method for the production of hollow bodies from thermoplastic, in particular for the production of motor vehicle tanks, in which the plastic is shaped as an extruded preform in the still plastic state or as a semi-finished product into at least two shells with the aid of at least one molding die (3), with the use of heat, and the subsequently cooled and then dimensionally stable shells are placed one on the other and joined together into an essentially closed hollow body. As molding die (3) is used at least one positive die which has essentially the contour of the shells. The shells are shaped by the plastic being laid against the positive die. The apparatus for carrying out the method is also disclosed.

9 Claims, 4 Drawing Sheets

Figure 10:
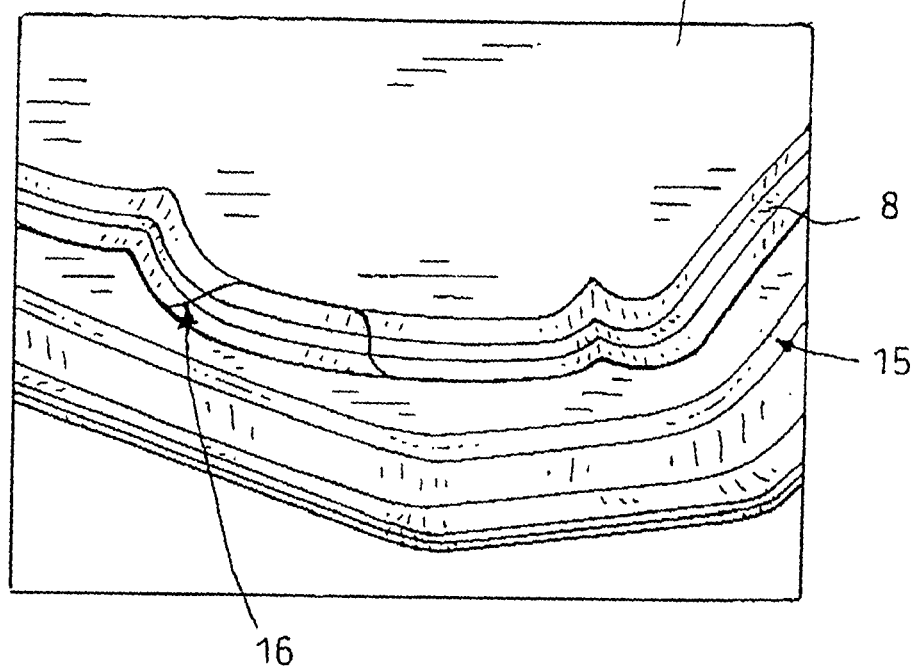

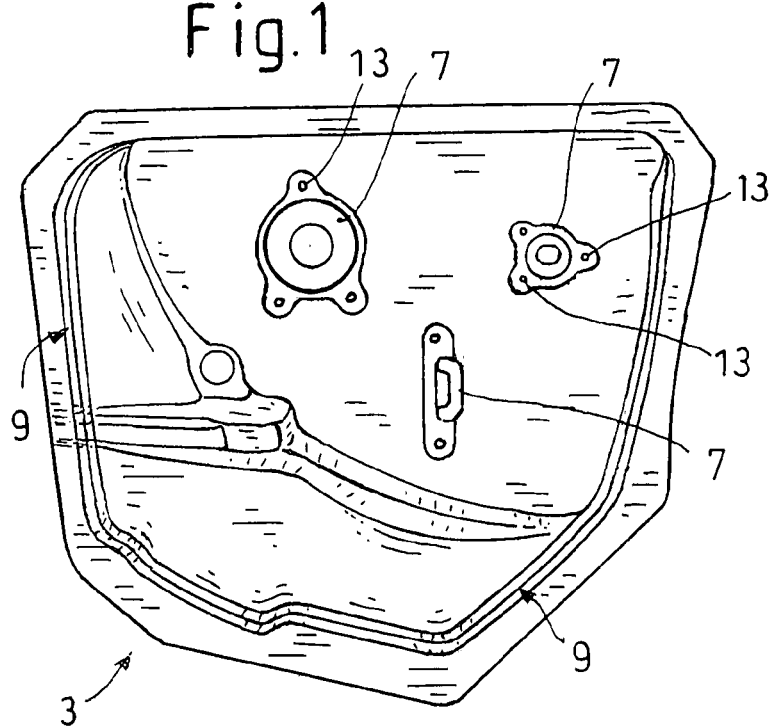
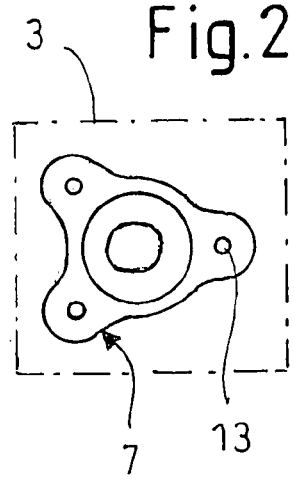
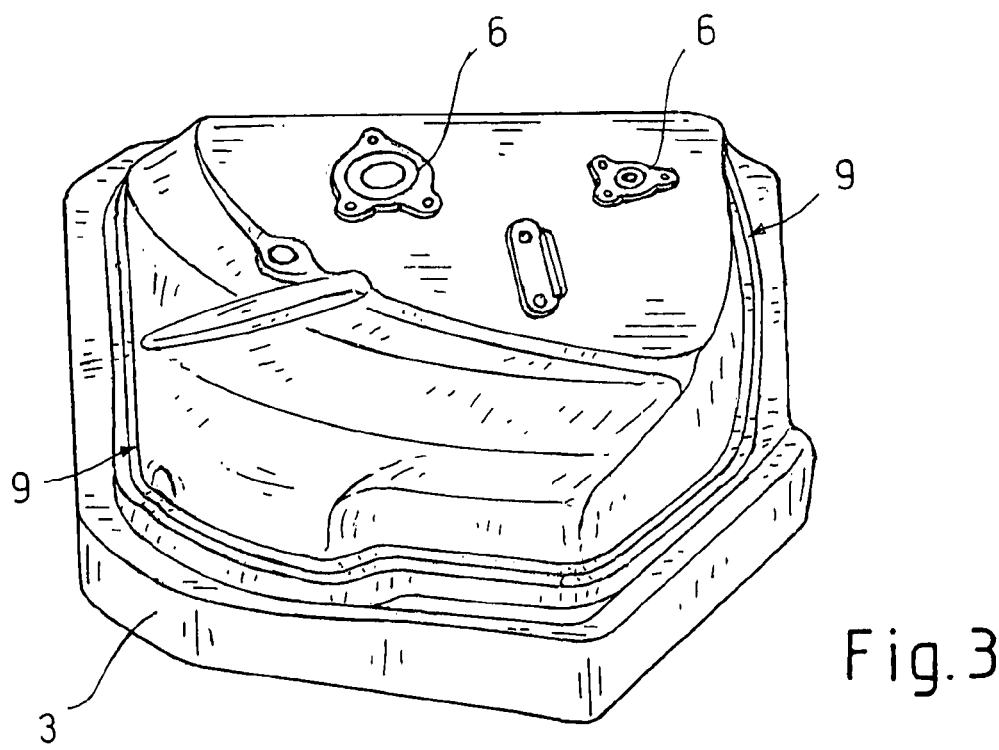

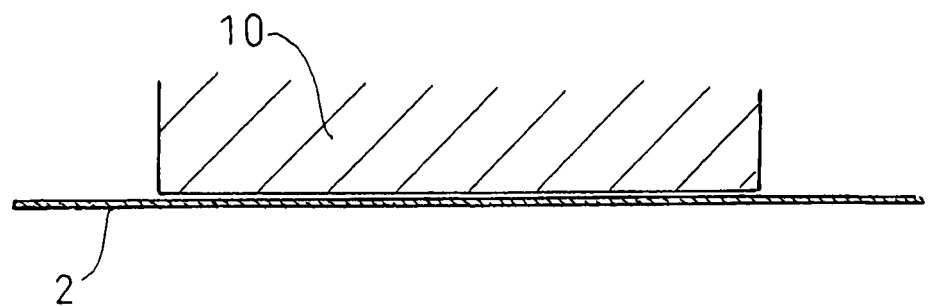
Fig.4
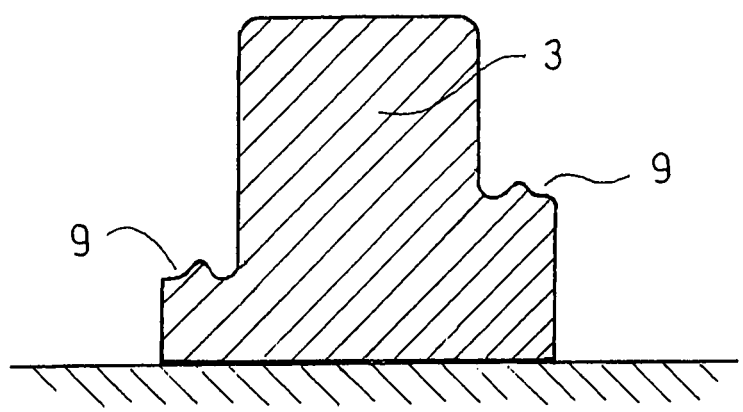
Fig.5
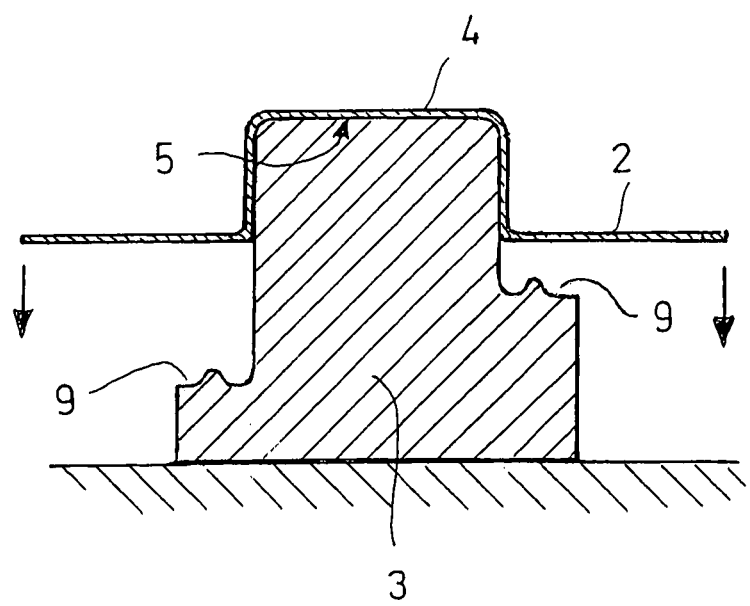

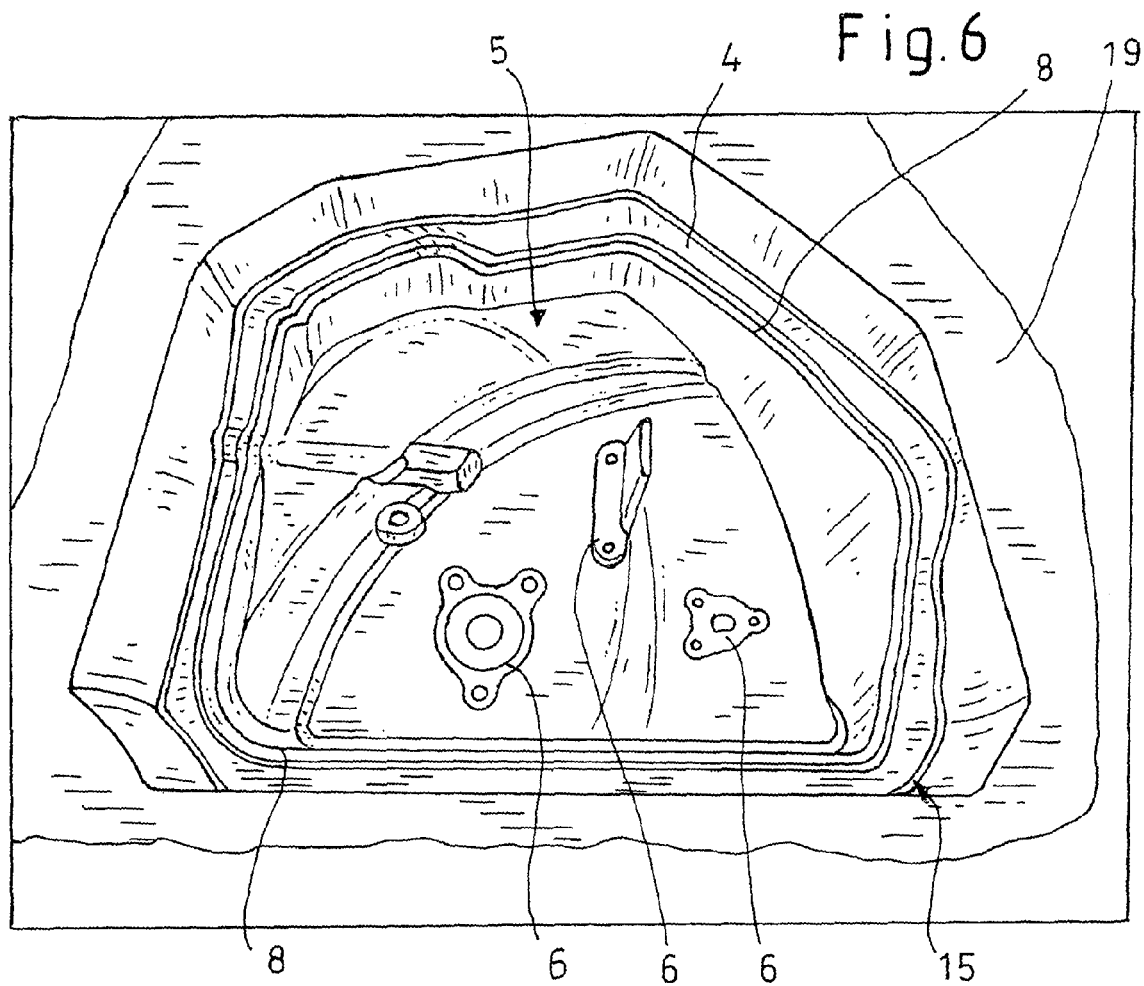
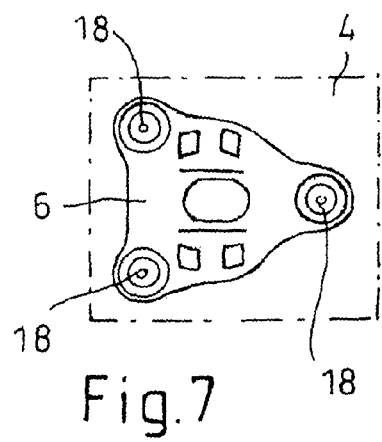
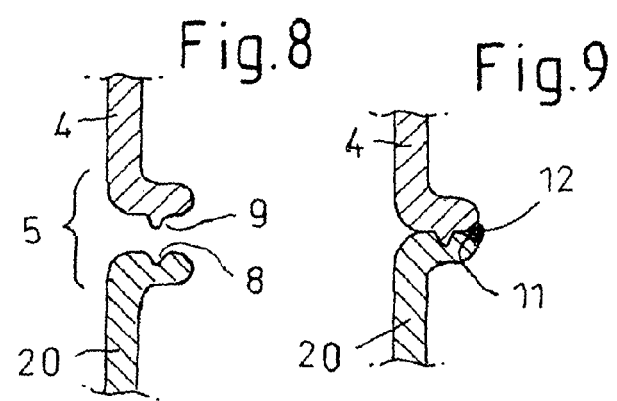

METHOD FOR THE PRODUCTION OF HOLLOW BODIES FROM THERMOPLASTIC AND APPARATUS FOR CARRYING OUT THE METHOD

The invention relates to a method for the production of hollow bodies from thermoplastic, in particular for the production of motor vehicle tanks.

The invention relates, furthermore, to an apparatus for carrying out the method.

Various methods for the production of hollow bodies from thermoplastic are known, for example extrusion blow-moulding or thermoforming.

In extrusion blow-moulding, a preform is extruded at an extrusion head and is then transformed into a hollow body with the aid of corresponding moulding dies. In some extrusion blow-moulding methods, a tube is extruded, in others a web-shaped preform, and, in yet other methods, a tubular preform which, after or during extrusion, is separated lengthways into web-shaped or sheet-like preforms.

The extruded preform is introduced in the still plastic state between the opened halves of a die. The die is closed around the preform, the latter being laid with the aid of differential pressure against the inner wall of the cavity formed by the die. The finished hollow body has an external configuration which corresponds to the internal contour of the moulding die.

In the production of hollow bodies which are used as industrial components, such as, for example, fuel tanks, it is necessary to fasten various fittings in the hollow body.

What has proved to be especially beneficial for introducing fittings during the production of the fuel tank is what is known as the twin-sheet blow-moulding method, in which two sheet-like web-shaped preforms are transformed into two half-shells inside the die in a first method step, in a subsequent method step fittings or components are inserted into the still hot-plastic shells located in the die, and in a final method step the shells provided with fittings are welded together into the finished hollow body. The advantage of this method is that the components can be placed in any desired arrangement on the inside of the tank wall while the hollow body is being shaped. However, this method and also the classic extrusion blow-moulding method require relatively high investment costs for dies.

Particularly in the production of fuel tanks, design changes from the first prototype provided for supplying samples up to the first series product are not uncommon. For the first supply of samples, customers often want prototypes, the quality and visual appearance of which come very close to those of the series product. In order to satisfy these requirements, it has hitherto been necessary to manufacture dies even for pilot production, this regularly entailing relatively high investment costs. Furthermore, a relatively long qualifying time is required from the initial determination of a design up to the finished prototype. Changing the dies in order to reproduce design changes is likewise highly complicated.

Particularly when fuel tanks are to be produced according to the above-described twin-sheet blow-moulding method, the investment costs for dies are extremely high because this method additionally necessitates a centre die. Any adaptation of the mould halves forming the mould cavity at the location where the tank seam would subsequently extend requires corresponding contour changes on the centre die which is complementary to these mould halves.

Producing hand samples in another way does not usually give the results wanted by the customer in terms of the visual appearance of the samples. Furthermore, it is not possible in this way to attach fittings in the tank such that the fastening of these approximately reproduces the fastening to be carried out during series production. However, this is desirable especially in order to make it possible to draw realistic conclusions as to the series product from the sample prototype.

The object on which the invention is based is, therefore, to provide a method, suitable for prototype production, for the production of hollow bodies from thermoplastic, in particular for the production of motor vehicle tanks, which is suitable for introducing components into the hollow bodies simultaneously with shaping, so that the connection between the components and the hollow body is comparable to that achieved in methods suitable for series production. In particular, the method is to be simple and is to entail only low investment costs for the dies required.

The object on which the invention is based is, furthermore, to provide an apparatus for carrying out the method for the production of hollow bodies, in particular of motor vehicle tanks.

The object is achieved by means of a method for the production of hollow bodies from thermoplastic, in particular for the production of motor vehicle tanks, in which the plastic is shaped as an extruded preform in the still plastic state or as a semi-finished product into at least two shells with the aid of at least one moulding die, with the use of heat, and the subsequently cooled and then dimensionally stable shells are placed one on the other and joined together into an essentially closed hollow body, the moulding die used being at least one positive die which has essentially the contour of the shells, and the shells being shaped by the plastic being laid against the positive die.

The object is achieved, furthermore, by means of an apparatus for carrying out the method for the production of hollow bodies from thermoplastic, comprising at least one extrusion head for extruding a preform or a heat source for heating a semi-finished product, a moulding die for shaping at least two shells from the preform or the semi-finished product by the preform or the semi-finished product being laid against the moulding die, and means for joining the shells together, the moulding die being a positive die which has essentially the contour of the shells.

One advantage of the method according to the invention is to be seen in that, when a moulding die designed as a positive die is used, the positive die comes into direct contact with those surfaces of the shells which are later directed inwards in the hollow body. Thus, any modifications of these surfaces, such as, for example, the fitting of components, can be carried out simultaneously with shaping by virtue of a corresponding configuration of the positive die. The quality of the connection between components thus introduced and the shell is therefore comparable to the quality which can be achieved in methods with a centre die. The method according to the invention is suitable especially for the production of prototypes or for the manufacture of fuel tanks in small series. By means of the method according to the invention, three-dimensional mould separation or a three-dimensional profile of the peripheral joining margin of the shells can be produced especially simply. In the method according to the invention, the hitherto required qualifying time from the first "design freeze" to the first pilot product/prototype is reduced to a fraction of the qualifying time previously required.

A further advantage is that only a single die is necessary for shaping and for fastening any components to the shells. The costs for the moulding die are therefore reduced considerably, as compared with methods with a centre die.

The positive die also has to fulfil considerably lower requirements.

A further advantage of the method according to the invention is to be seen in that, when the positive die is produced from a corresponding material block, only minimal material removal is necessary, and the die can be produced in an automated way by means of known methods, such as, for example, CNC milling. The production of the positive die is thus carried out cost-effectively and without a great amount of time being expended.

Furthermore, a fundamental benefit of the method according to the invention, as compared with more complicated methods, such as, for example, extrusion blow-moulding, is to be seen in that, when the finished hollow bodies are produced from semi-finished products, the manufacturer does not have to keep in readiness any extrusion devices which, in the case of large preforms to be produced, require a relatively large amount of installation space.

A further advantage of the method according to the invention is that only the inner contour of the shell comes into contact with the moulding die. This contact face may, as a consequence of the method adopted, have discolourations and possible expansion streaks, but, in contrast to deep-drawing methods, is no longer visible after the hollow body has been manufactured.

According to the invention, the extruded preform may be of single-layer or multi-layer type, and the semi-finished products may consist of correspondingly ready-made cooled extruded preforms. The extruded preforms or semi-finished products may also have a wall thickness profile.

A moulding die is to be understood as being a die which has a surface, with the aid of which the plastic is shaped by being laid against this surface. According to the invention, the moulding die is designed as a positive die, in the context of the present application a positive die being understood to mean a moulding die, of which the surface for moulding the plastic is essentially convex. Correspondingly, the surface of the positive die for moulding the plastic during the shaping of the shells comes into direct contact essentially with those surfaces of the shells which form the inwardly directed surfaces of the hollow body after the shells have been joined together.

Preferably, the positive die is moved into the circumferentially clamp-mounted softened semi-finished product. Alternatively, the softened semi-finished product can be moved in relation to the fixedly arranged positive die.

Expediently, the positive die used is a positive die which has at least one recess for receiving at least one component.

The method comprises, furthermore, the introduction of the component into the recess, the component being positioned and fastened in the respective shell simultaneously with shaping. Components which may be considered are, for example, feed units, filling-level indicators, aerating and deaerating valves and also baffle walls. According to the invention, however, a component may also be understood to mean a holder for the abovementioned fittings or functional components. The fittings or functional components are fastened to the holder, connected fixedly to the shell, before the shells are welded together. By the component being introduced into the recess of the positive die, the component can be positioned and fastened in the respective shell simultaneously with shaping. What is also advantageous in using such a positive die is, for example, that, in the course of prototype development, the positive die can be adapted cost-effectively to changed conditions by adding additional recesses in the positive die. Thus, new, slightly changed shells can be produced in the course of prototype development.

In a preferred variant of the method according to the invention, a closing ring in the form of a metallic bayonet ring is introduced into at least one shell. The bayonet ring is pressed by means of a top ram into the semi-finished product, already moulded onto the positive die, from outside, that is to say on that side of the shell which faces away from the positive die, such that the material penetrates through and flows behind a perforation provided in the bayonet ring. In the positive die, a corresponding recess is provided, into which the bayonet ring is inserted. This closing ring defines, for example, the position of the later inspection orifice and serves for receiving a feed unit to be inserted in the latter. The orifice to be provided inside the ring is circled after the manufacture of the shell.

In a preferred variant of the method, the laying-on of the plastic and/or the fastening of the component take/takes place, using differential pressure. For example, in order to generate underpressure, a positive die may be used which comprises vacuum bores and/or vacuum ducts. These are acted upon with underpressure, with the aid of which the plastic is laid against the positive die. Alternatively, the plastic may be laid against the positive die by overpressure.

In an especially advantageous refinement of the invention, the laying-on of the plastic takes place essentially without additional mechanical aids solely with the aid of differential pressure. Essentially without additional mechanical aids means, in the context of the invention, that the large-area laying of the plastic of the shell against the positive die takes place without mechanical aids, but that, in the context of the invention, the situation is not to be ruled out where the material is pressed down by means of rams or similar aids in a locally limited way, in the region of components to be introduced into the shells, during shaping, from that side of the shells which faces away from the positive die.

In a further advantageous refinement of the invention, the shells, before being joined together, are centred with respect to one another with the aid of means provided on the shells during shaping. Expediently, corresponding means for centring are introduced into the shells even during the shaping of these. For example, shaping may comprise generating a contour in a first shell and a contour, essentially complementary thereto, in a second shell. When the shells are being placed one on the other, centring can then take place by engagement of the complementary contours one into the other. Centring prevents the shells from being displaced in relation to one another. The joining of the shells can thus be simplified and accelerated. The mutually complementary contours may be designed, for example, as tongue-and-groove geometry.

In the version of the method in which the plastic is shaped as a semi-finished product, using heat, the plastic is expediently irradiated with a heat source on one side or on both sides before and/or during shaping.

In an especially advantageous refinement of the invention, a temperature profile is imparted to the plastic during heating, so that the material flow when the plastic is being laid against the moulding die and therefore the shaping of the plastic into a shell can be controlled. For example, the plastic may be heated to a greater or lesser extent at those locations where edges or roundings are present in the moulded shell than in other regions.

After the plastic has been laid against the positive die, the shells are cooled into dimensionally stable shells. These can thereupon be released from the positive die. Cooling may take place both actively and passively.

Expediently, the shells are joined together by welding. In this case, the two shells, after being placed one on the other, are welded together into a hollow body.

In a further refinement of the invention, welding takes place with an additional welding additive. A welding additive may be understood to be a material compatible with the thermoplastic of the shells during welding. In particular, it may be understood to mean a heated thermoplastic which corresponds to the material of which the semi-finished product or the preform is composed. This is introduced between the welding faces during welding, in order thereby to form a weld seam composed of welding additive and welding faces. For example, welding may take place by means of a plasticized polyethylene strand ejected from a corresponding device. In this case, additional heating of the welding faces takes place before the welding additive is applied, preferably by means of hot air.

In an alternative refinement of the invention, the shells are joined together by adhesive bonding with the aid of an adhesive or an adhesion promoter. A combination of adhesive bonding and welding can also be envisaged.

In an especially advantageous refinement of the invention, the method comprises, furthermore, the generation of a groove for receiving the welding additive, which groove runs peripherally essentially between the shells placed one on the other and is formed out of the marginal region of the shells. The groove formed between the shells may be generated, for example, by means of a corresponding contour of the marginal region of the shells, the said contour having been obtained during the shaping of the shells by means of the positive die. Alternatively, the groove formed between the shells may have been generated by cutting machining after the shells had been placed one on the other. The welding additive is subsequently introduced into this groove during welding.

A further subject of the present invention is an apparatus for carrying out the method according to the invention. According to the invention, the apparatus comprises an extrusion head for extruding a preform or a heat source for heating a semi-finished product and a moulding die for shaping at least two shells from the preform or the semi-finished product by the preform or the semi-finished product being laid against the moulding die. In this case, the moulding die is a positive die which has essentially the contour of the shells.

Expediently, the moulding die has recesses for receiving at least one component. The components can thus be positioned and fastened in the shells simultaneously with the shaping of these.

In an advantageous refinement of the invention, the moulding die comprises vacuum bores and/or vacuum ducts. In this case, at least one vacuum bore and/or at least one vacuum duct are/is arranged in the recesses. The vacuum bores in the recesses are preferably arranged below at least one clearance in the component, so that, after the plastic has been laid against the moulding die, the plastic is drawn into the clearance with the aid of differential pressure and thus fills the clearance in such a way that the components are connected positively to the shell.

In an especially advantageous refinement of the invention, the moulding die is produced from polyurethane or aluminium. Thus, a corresponding moulding die can be produced from a block material cost-effectively and without great effort. For example, the production of the positive die by CNC milling can be automated.

Figure 11:
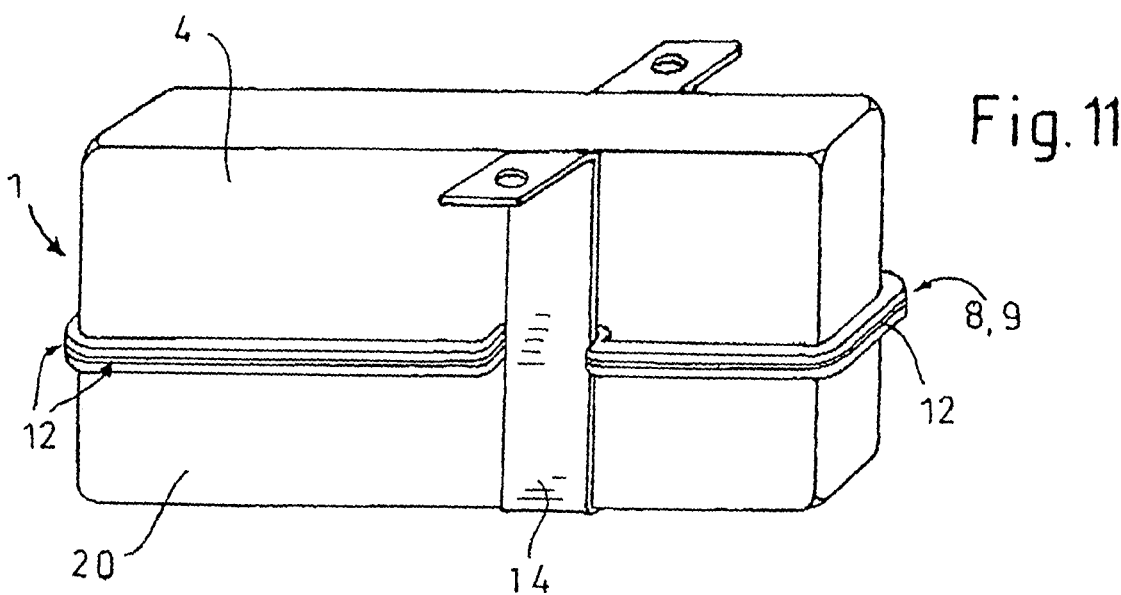

An advantageous refinement of the method according to the invention for the production of hollow bodies from thermoplastic, in particular for the production of motor vehicle tanks, is explained by means of the exemplary embodiment illustrated in the drawings in which:

FIG. 1 shows a diagrammatic view of a positive die for the shaping of plastic into shells for use in the method according to the invention, FIG. 2 shows a diagrammatic view of the recesses from FIG. 1 for receiving a component, FIG. 3 shows a diagrammatic perspective view of the positive die from FIG. 1 with components introduced in the recesses, FIG. 4 shows a diagrammatic illustration of the method step in which the plastic is heated in order subsequently to be shaped by means of a positive die, FIG. 5 shows a diagrammatic view of the method step in which the plastic is shaped with the aid of the positive die by being laid on, FIG. 6 shows a diagrammatic perspective view of a cooled and dimensionally stable shell, FIG. 7 shows an enlarged diagrammatic illustration of a component fastened in the shell illustrated in FIG. 6, FIG. 8 shows an enlarged view of two mutually complementary contours in a first and a second shell before the two shells are placed one on the other, FIG. 9 shows an enlarged view of the mutually complementary contours after the shells have been placed one on the other, FIG. 10 shows an enlarged view of the marginal region of the shell from FIG. 3 before the deburring of the shell, and FIG. 11 shows a diagrammatic view of two shells composed to form a hollow body, the hollow body being held in the installation position by means of a clamping strap.

The figures illustrate diagrammatically an apparatus 3 according to the invention for carrying out the method for the production of hollow bodies, and also shells 4, 20 produced by means of the method and the hollow body 1 produced, during various method steps.

In the exemplary embodiment described here, the initial material used is a semi-finished product 2. The semi-finished product 2 may have been produced, for example, by the cooling of a correspondingly extruded preform. The semi-finished product 2 is heated and is shaped with the aid of two positive dies in each case into a shell, specifically into a first shell 4 and a second shell 20. The shells 4, 20 are placed one on the other, centred, and are then welded together into a hollow body 1.

The production of the first shell 4 with the aid of a positive die 3 is described in more detail below. The production of the second shell 20 takes place correspondingly, although the actual configuration of the shell may be different. The description of this exemplary embodiment deals below with the actual configuration of the second shell 20 only when this is critical in connection with the configuration of the first shell 4.

First, the semi-finished product 2 is heated with the aid of a heat source 10, as illustrated diagrammatically in FIG. 4, in order subsequently to be laid against the positive die 3. FIG. 4 reproduces the positive die 3, likewise in simplified form, in a cross-sectional view. The basic form of the moulding die 3 can be seen from FIG. 4, in the lateral marginal regions of the moulding die 3 a contour 9 being illustrated which, when the semi-finished product 2 is laid against the die, is transferred in a correspondingly complementary form to the shell 4. The contour 8 inside the shell 4 is in this case generated by the semi-finished product 2 being laid against the positive die 3 and therefore by the shaping of the semi-finished product 2. After the cooling of the thermoplastic laid against the positive die 3, the shell 4 is left behind as a dimensionally stable shell with a flange-like margin and with a corresponding contour 8 which corresponds to a groove profile. This complementary contour 8 serves later as means for centring the two shells 4, 20 with respect to one another, there being generated in the flange-like margin of the second shell 20 a contour 9 which is correspondingly complementary to the contour 8 generated in the shell 4 and corresponds to a tongue profile and the form of which is comparable to the contour 9 of the positive die 3 illustrated here. When the first shell 4 and the second shell 20 are placed one on the other, the mutually complementary contours thus produced, corresponding to a tongue-and-groove profile, ensure that the shells are centred. The contour 9, as illustrated in FIG. 4, is illustrated as being offset vertically on one side with respect to the corresponding contour 9 on the opposite side of the positive die 3. The offset is illustrated in a slightly exaggerated way, but is intended to reproduce the basically three-dimensional profile of the marginal region of the shells 4, 20, within which the contours are arranged.

FIG. 1 illustrates in more detail the positive die 3 for carrying out the method according to the invention. The positive die 3 has recesses 7 for the reception of components 6. These, and also the contour 9 extending peripherally at the margin, are illustrated in FIG. 1. The contour 9 is correspondingly complementary to the contour 8, produced with the aid of the positive die 3, inside the first shell 4.

Furthermore, the positive die 3 illustrated in FIG. 1 has a plurality of vacuum bores 13 in the recesses 7. In order to simplify the illustration, no further vacuum bores or vacuum ducts for laying the plastic against the positive die 3 are illustrated in FIG. 1. Such vacuum bores or vacuum ducts basically ensure, when underpressure is applied, that the heated semi-finished product 2 is laid against the positive die 3 as a result of the underpressure.

The vacuum bores 13 illustrated in the recesses 7 can be seen in the enlarged view illustrated in FIG. 2. As already mentioned, underpressure applied to these vacuum bores 13 ensures that the thermoplastic of the heated semi-finished product 2 is drawn onto the positive mould.

Components 6 are laid into the recesses 7. FIG. 3 shows a diagrammatic perspective view of the positive die 3 already illustrated in FIG. 1, the difference being that, in FIG. 3, the components 6 are introduced into the recesses 7. In this case, the components 6 introduced in the recesses 7 are holders for functional components, not illustrated, which are to be fastened later to the holders.

In the case of the vacuum bores 13 illustrated in FIG. 2, therefore, when the semi-finished product 2 is laid against the positive die 3 the components 6 are located between the semi-finished product 2 and the vacuum bores 13. Expediently, clearances are located within the components 6 and are preferably arranged in the immediate vicinity of the vacuum bores 13. The plastic is then led through these clearances with the aid of the differential pressure applied to the vacuum bores 13. This gives rise to a positive connection between the plastic or heated semi-finished product 2 and the components 6.

After the heating of the semi-finished product 2 and the introduction of the components 6 into the recesses 7, the laying, illustrated in FIG. 5, of the heated semi-finished product 2 against the positive die 3 therefore takes place. The recesses 7 and components 6 are not illustrated in FIGS. 4 and 5. As illustrated in FIG. 5, the method step in which the plastic 2 is laid against the positive die 3 is not yet concluded completely. The plastic 2 is subsequently drawn further onto the positive die 3 with the aid of a prevailing differential pressure. The force acting on the plastic 2 as a result of the differential pressure is directed towards the positive die 3 in the direction of the arrows illustrated diagrammatically in FIG. 5.

FIG. 6 shows a diagrammatic perspective view of the shell 4 produced by means of the method according to the invention, after cooling. The figure illustrates the components 6 fastened in the shell 4, and also the peripheral contour 8. A groove, not illustrated, extending peripherally at the margin of the positive die or a peripheral incipient fracture generates a sectional line 15 when the plastic 2 is laid on. As illustrated in FIG. 6, the sectional line 15 surrounds the contour 8. The sectional line 15 delimits the shell 4 from the projecting portion 19 to be detached. The projecting portion 19 is separated from the shell 4 by subsequent deburring along the sectional line 15.

FIG. 7 is an enlarged view of a component 6 fastened in the shell 4. The component 6 has clearances, into which the plastic 2 is drawn with the aid of the vacuum bores 13 illustrated in FIG. 2, as described above. The plastic 2 drawn into the clearances forms fastenings 18 which, by positive engagement with the clearances in the components 6, fasten the components to the shell 4.

The shells 4, 20 are placed one on the other and joined together into an essentially closed hollow body 1. In the method described here, the shells 4, 20, when placed one on the other, are first centred by means for centring. As explained above, the means for centring which are provided are correspondingly mutually complementary contours 8, 9 during the shaping of the two shells 4, 20. The two contours 8, 9 can be seen diagrammatically in FIG. 8 which illustrates a cross-sectional view of a connection region of the two shells 4 and 20. FIG. 6 reproduces diagrammatically the marginal region of the shell 4 with the contour 9 and the marginal region of the shell 20 with its correspondingly complementary contour 8. The two shells 4 and 20 are placed one on the other and thereupon joined together. Joining takes place by welding, the groove 11 formed receiving a welding additive 12 in the form of heated plastic during welding. FIG. 9 reproduces a corresponding cross-sectional view of the joining region.

The hollow body 1 is provided with a clamping strap 14 which holds it in the installation position. The clamping strap is intended to bear against the said hollow body in the joining region of the shells. In order to achieve this, in the region in which the clamping strap 14 moves past the joining region of the shells 4, 20 the outwardly projecting region of the shells 4, 20, within which region the contours 8, 9 for centring are arranged, is cut off, so that the weld seam 12 (weld bead) is drawn in in this region.

FIG. 10 reproduces an enlarged perspective view of the marginal region of the shell 4 illustrated in FIG. 6. The contour 8 and also the sectional line 15 for deburring the shell 4 can be seen. Furthermore, FIG. 10 illustrates a sectional line 16, along which the projecting marginal region of the shell 4 is cut off.

The projecting marginal region is also removed correspondingly in the second shell 20. Welding takes place, as described above, and joins the two shells 4, 20 together by means of a completely peripheral weld seam 12.

The hollow body 1 thus formed is illustrated in FIG. 11. The hollow body 1 is designed, for example, as a fuel tank for a motor vehicle. The hollow body designed as a fuel tank is fastened in the installation position in the motor vehicle, for example, by means of a clamping strap 14. The shells 4, 20 illustrated in FIG. 11 are reproduced merely diagrammatically and show no detailed contours 8, 9 of the shell surface, as are illustrated, for example, in FIG. 6.

LIST OF REFERENCE SYMBOLS

1. Hollow body
2. Semi-finished product
3. Moulding die (positive die)
4. First shell
5. Inwardly directed surfaces of the hollow body
6. Component
7. Recess in the moulding die for components 8. Contour
9. Complementary contour
10. Heat source
11. Peripheral groove
12. Weld seam
13. Vacuum bores
14. Clamping strap
15. Sectional line for deburring
16. Sectional line for recesses for receiving the clamping strap
18. Component fastenings
19. Projecting portion
20. Second shell

The invention claimed is:

1. Method for the production of hollow bodies from thermoplastic for the production of motor vehicle tanks, in which the plastic is shaped as a semi-finished product into at least two shells with the aid of at least one moulding die, with the use of heat to soften the semi-finished product, and the subsequently cooled and then dimensionally stable shells are placed one on the other and joined together into a hollow body, the moulding die used being at least one positive die which has a contour of the shells, and the shells being shaped by the plastic being laid against the positive die, wherein the semi-finished product is clamped and the positive die is moved into the clamped and softened semi-finished product, so that only an inner contour of the shells comes into contact with the moulding die.

2. Method according to claim 1, characterized in that the positive die used is a positive die with at least one recess for receiving at least one component, and the method comprises, furthermore, the introduction of the component into the recess, and the component is positioned and fastened in the shells simultaneously with shaping.

3. Method according to claim 2, characterized in that the positioning and/or fastening of the component take/takes place, using differential pressure.

4. Method according to claim 1, characterized in that the shells, before being joined, are centred with respect to one another with the aid of means for centring provided on the shells during shaping.

5. Method according to claim 1, characterized in that the semi-finished product is irradiated with a heat source on one side or on both sides before and/or during shaping.

6. Method according to claim 5, characterized in that a temperature profile is imparted to the semi-finished product during heating.

7. Method according to claim 1, characterized in that the shells are joined together by welding and/or adhesive bonding.

8. Method according to claim 7, characterized in that welding takes place with a welding additive.

9. Method according to claim 8, characterized in that the method comprises, furthermore, the generation of a weld bead, extending peripherally between the shells placed one on the other, into a groove, formed by the surfaces of the shells, for receiving the welding additive.

* * * * *